Figure 4:
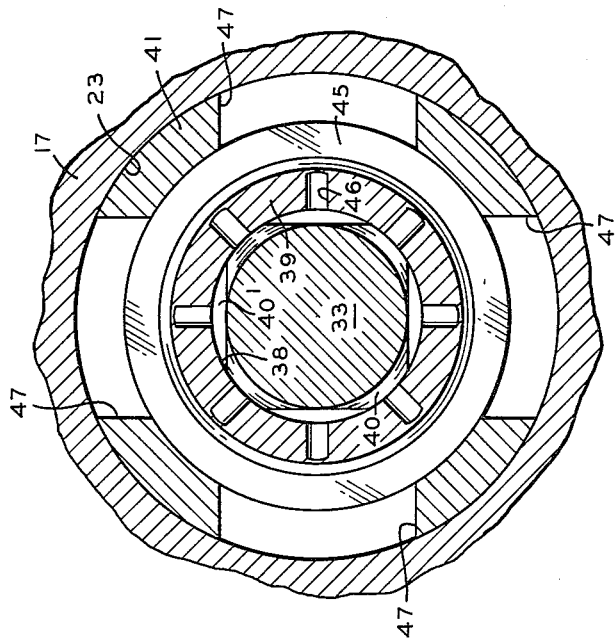

May 28, 1963 R. E. SCHWARTZ ETAL 3,091,086
POWER HYDRAULIC BRAKE DEVICE AND SYSTEM
Original Filed March 28, 1955 2 Sheets-Sheet 1
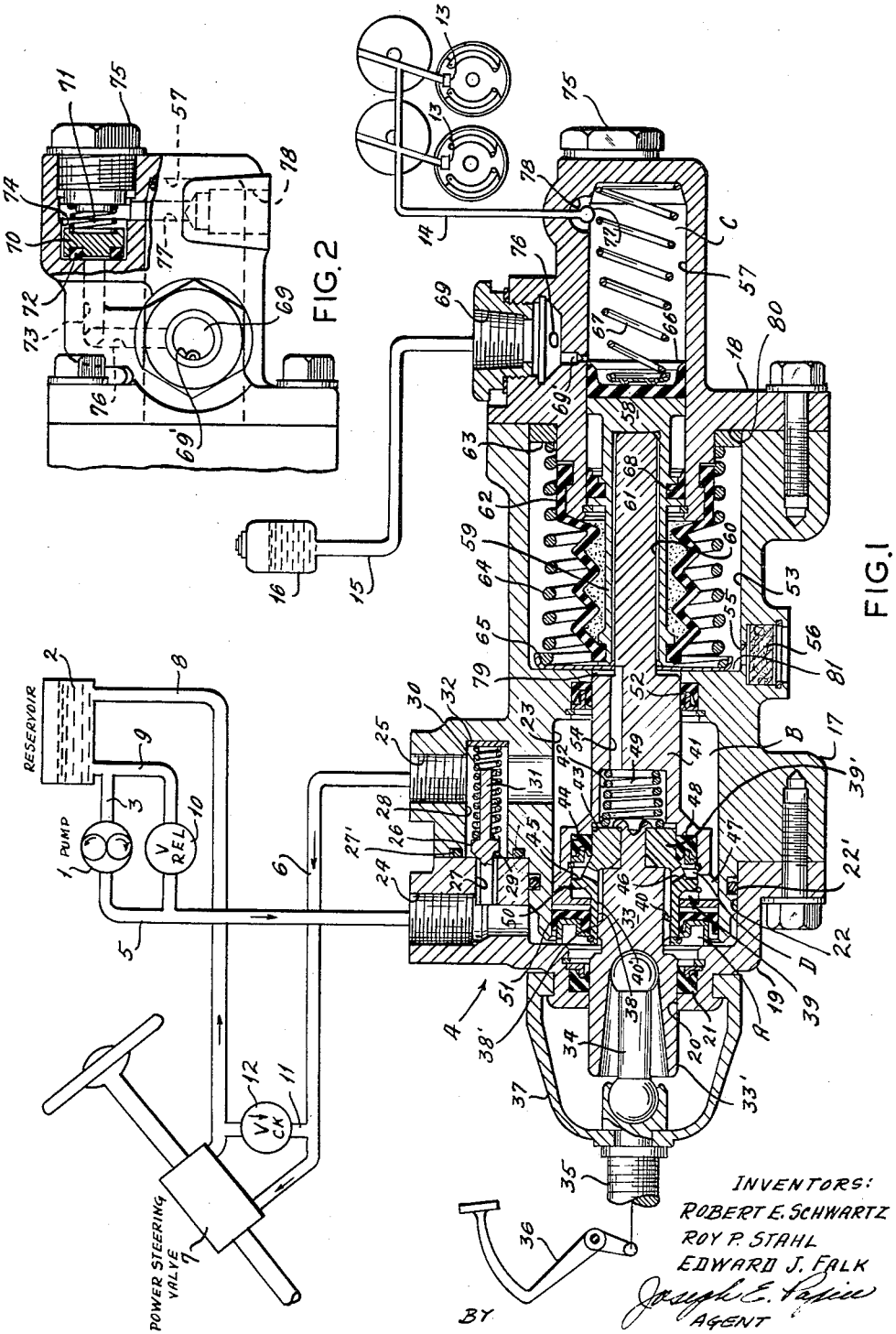
INVENTORS:
ROBERT E. SCHWARTZ
ROY P. STAHL
EDWARD J. FALK
BY Joseph E. Papin
AGENT May 28, 1963 R. E. SCHWARTZ ETAL 3,091,086
POWER HYDRAULIC BRAKE DEVICE AND SYSTEM
Original Filed March 28, 1955 2 Sheets-Sheet 2

INVENTORS
ROBERT E. SCHWARTZ
ROY P. STAHL
EDWARD J. FALK
BY *Gravely, Lieder & Woodruff*
ATTORNEYS

United States Patent Office 3,091,086
Patented May 28, 1963

3,091,086
POWER HYDRAULIC BRAKE DEVICE AND SYSTEM
Robert E. Schwartz, Clayton, Mo., Roy P. Stahl, South Bend, Ind., and Edward J. Falk, St. Louis, Mo., assignors to Wagner Electric Corporation, St. Louis, Mo., a corporation of Delaware
Application Mar. 15, 1960, Ser. No. 15,221, now Patent No. 3,044,265, dated July 17, 1962, which is a continuation of application Ser. No. 497,272, Mar. 28, 1955. Divided and this application Nov. 3, 1961, Ser. No. 150,030
10 Claims. (Cl. 60—54.6)

This invention relates to power hydraulic systems and the controlling means therefor, and in particular, to a power brake system and servo motor utilizing separate power hydraulic pressure fluid and brake fluid.

In general, this invention comprises an operator controlled servo motor serially arranged with positive displacement pumping means in a power hydraulic system for the actuation of a brake system. It is well-known in the industry that a mineral base pressure fluid is preferable as a power hydraulic fluid, but that the best materials known for sealing members and like resilient components for a brake device are attacked by such fluid and have a relatively short life. Accordingly, the best power fluid is not compatible with the best pressure producing fluid for brake actuation, and in the past a compromise fluid has generally been utilized because of the rapid seal deterioration and dilution of one pressure fluid by the other when attempts have been made to use separate power and actuation fluids. However, because of the improved fluid operating characteristics produced by using separate power hydraulic pressure fluid and brake fluid, it is advantageous and desirable to provide an improved servo motor having isolated power and brake actuating portions.

One of the principal objects of the present invention is to provide a servo motor which completely separates the fluid in the series power hydraulic portion of the system from the fluid in the braking portion of the system.

Another object of the present invention is to provide a braking system operated by a servo motor in series with a power system, but which functions independently of the ambient pressure in any section of the power system.

Still another object of the present invention is to provide a servo motor which provides "feel" for the operator. "Feel" is the proportional reactionary force in opposition to the applied force affording the operator an appraisal as to the extent of application.

Another object of the present invention is to provide a servo motor which operates even in the event of power failure to provide safe operation of the braking system.

A still further object is to provide a servo motor having novel pressure fluid compensation means for a brake cylinder portion thereof.

Figure 3:
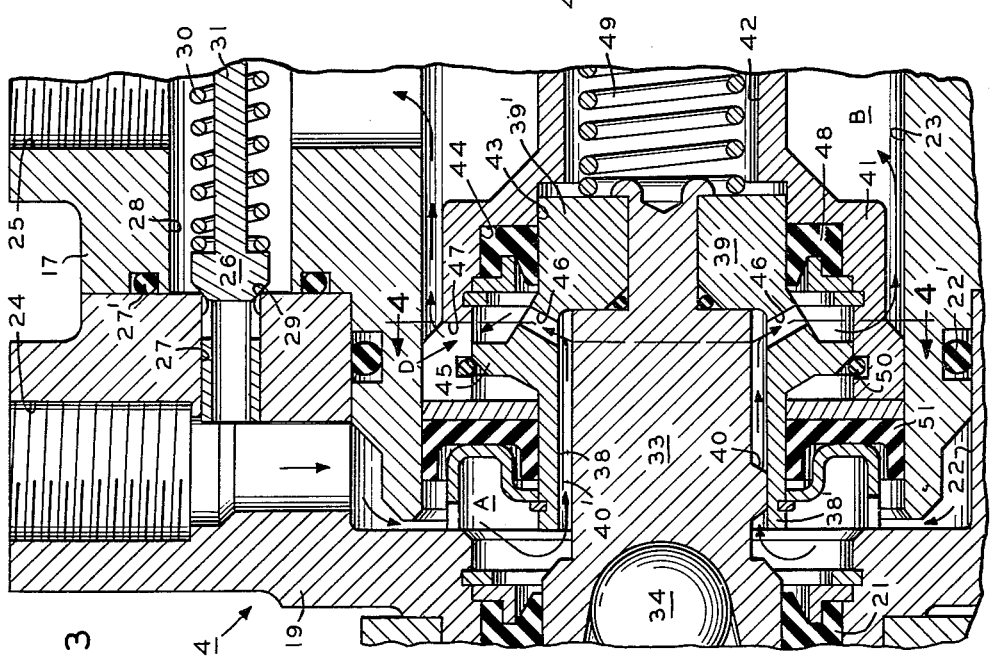

The invention also consists in the parts and in the arrangements and combinations of parts hereinafter described and claimed. In the accompanying drawings which form part of this specification and wherein like numerals and symbols refer to like parts wherever they occur:

FIG. 1 is a diagrammatic view of a power hydraulic braking system with a longitudinal cross-sectional view of the power hydraulic brake device shown therein, FIG. 2 is a fragmentary cross-sectional view showing the compensation valve of the preferred embodiment in detail, FIG. 3 is a greatly enlarged fragmentary view of the flow throttling portion of the power hydraulic brake device shown in FIG. 1, and FIG. 4 is a cross-sectional view taken along line 4—4 in FIG. 3.

This is a division of copending application, Serial No. 15,221 filed March 15, 1960, now Patent No. 3,044,265, for Power Hydraulic Brake Device and System, which application is a continuation of our application Serial No. 497,272, filed March 28, 1955, now abandoned, for Power Hydraulic Brake Device and System.

Referring to FIGS. 1, 3 and 4, the power hydraulic system comprises a pumping means 1 having one side connected to a reservoir 2 by a conduit 3 and the pressure side connected to the inlet of the power portion of a servo motor 4 by a conduit 5. A conduit 6 connects the outlet of the power portion of the servo motor 4 with a power steering valve 7 arranged in series with said servo motor 4. The outlet of the steering valve 7 is connected to the reservoir 2 by a conduit 8 which provides a return passage for the oil displaced by the pumping means 1. A conduit 9 having a pressure relief valve 10 interposed therein connects the conduits 3 and 5, the relief valve 10 protecting the pumping means 1 from pressure overload above a predetermined value. A conduit 11 connects the conduits 6 and 8 and has a reverse flow valve 12 interposed therein to facilitate pressure fluid recirculation during a power failure steering application. If desired, the valve 12 may be integral with the power steering valve 7. The braking system includes a plurality of wheel cylinders 13 connected to the brake actuating portion of the servo motor by a conduit 14. A conduit 15 connects a brake fluid reservoir 16 to the servo motor for compensation purposes. According to the present invention, the power system contains a mineral oil base pressure fluid and the braking system contains a typical hydraulic brake fluid.

The servo motor 4 comprises a booster housing 17 having a brake portion housing 18 secured to the right-hand end and defining a pressure producing outlet chamber or master cylinder chamber C, and an intake housing 19 secured to the left-hand end of the booster housing 17 and defining therewith a power portion of the servo motor 4. The power portion includes an inlet chamber A and an outlet or return chamber B as will be more fully defined hereinafter. The intake housing 19 has a rod receiving bore 20 with a sealing assembly 21 supported therein and an axially aligned counterbore 22. The counterbore 22 receives a leftward extension of the booster housing 17 which has a counterbore 23 therein, the extension supporting an O ring 22' which seals between the booster housing 17 and the counterbore 22. The intake housing 19 also has a vertically disposed inlet 24 to which the conduit 5 from the pumping means 1 is connected and which connects with the inlet chamber A. A return port or outlet 25 connects with the reservoir chamber B defined in part by the counterbore 23 in the booster housing 17. A sleeve type pressure relief valve 26 is interposed between the inlet 24 and outlet 25 and is received in a connecting passage formed by a horizontally disposed bore 27 and an axially aligned counterbore 28, the valve 26 being biased against a seat 29 by a spring 30 which circumscribes a guide extension 31 of the valve 26. The right end of the spring 30 abuts against a compression adjusting spacer 32 interposed between the spring 30 and the right end of the counterbore 28. An O ring 27' provides a seal between the housing 17 and 19 circumscribing the bore 27 and the counterbore 28. The pressure relief valve 26 is provided in by-pass relation with the power chambers A and B and is biased by the predetermined force of the spring 30 into normally sealed position with the seat 29. However, power hydraulic pressures developed in the inlet chamber A by power control means including a piston rod 33 and a throttling valve 39 for actuating a power piston 41 to develop braking pressures in the pressure producing chamber C may act on the effective area of the valve 26 to overcome the force of spring 30 in order to prevent overloading the pumping means 1.

The piston rod 33 includes a leftward portion 33' slidably mounted in the bore 20 and receiving a linkage 34 pivotally mounted between the rod 33 and one end of a push rod 35. The other end of the push rod 35 is operatively connected with suitable actuating means such as an actuating pedal 36 having intermediate linkage (not shown) interposed therebetween. A resilient boot 37 interposed between the push rod 35 and the intake housing 19 prevents the entry of foreign materials, but the effective area of the portion 33' to the left of the seal 21 is subjected to atmospheric pressure.

The rod 33 extends coaxially into a counterbore 38 of a leftward sleeve portion 38' of the throttling valve 39 and is spaced therefrom by a plurality of ears 40 to provide an annular passage 40' in communication with the inlet chamber A. The right end of the rod 33 is secured to the valve 39. The power piston 41 is slidably positioned in the counterbore 23 and divides the power chamber into the inlet and outlet chambers A and B. The piston 41 includes an inner bore 42, an intermediate bore 43, and an outer bore 44. The valve 39 is positioned in the outer bore 44 and has a radially-extending annular flange 45 therein and the valve 39 also includes a rightward portion 39' extending into the intermediate bore 43 of the power piston 41. A plurality of angularly arranged passages 46 are formed in the valve 39 connecting the counterbore 38 with the outer bore 44, and the outer circumferential portion at the left end of piston 41 having a plurality of throttling passages 47 providing communication between the outer bore 44 and the chamber B. The passages 47 form a throttling passage D in combination with the radial flange 45 of the throttling valve 39.

A seal assembly 48 is provided in the outer bore 44 between the bore 44 and the periphery of the rightward portion 39' of the valve 39. The rightward portion 39' and the leftward portion 33' of the piston 33 have the same diameters and therefore have the same effective end areas outwardly of the seals 48 and 21, respectively. In order to provide a balanced power piston arrangement as taught herein, it is necessary to subject these effective areas to the same surrounding or ambient pressure which in this case is atmospheric. A spring 49 of negligible force is mounted in the inner bore 42 biasing the radial flange 45 of the valve 39 leftwardly to its open or unrestricted position abutting a stop ring 50 supported in the outer bore 44. It will be noted that the stop member 50 is positioned intermediate the axial extent of throttling passages 47, and that the radial flange 45 is movable with the throttling valve 39 to a throttling position restricting but not closing the passage D. In both positions, the leftward side of the radial flange 45 is subjected to the same fluid pressure that prevails in return chamber B and the rightward side of the flange 45 is subjected to chamber A fluid pressures. The opposed effective areas of the piston rod 33 and throttling valve 39 between the seals 21 and 48 are equal.

The valve 39 carries a seal assembly 51 which extends into sealed condition with the counterbore 23 at the left end of the piston 41 and seals between the chambers A and B, the seal assembly 51 having a retainer member to keep the sealing cup in sealing position. The retainer acts as a stop member for the piston rod 33 and throttling valve 39 against the left end of the intake bore 22, and is also perforated for the free passage of power hydraulic fluid. The opposite effective areas of the power piston 41 in chambers A and B and across the sealing cup 51 are equal. Another sealing assembly 52 is positioned in the right end of the counterbore 23 and provides a seal around the piston 41, the seal 52 and each of the other seals in the power portion of the servo motor being of a material adapted for long life with mineral oil base power fluid.

A fluid separation counterbore or chamber 53 is axially aligned with the counterbore 23 and is in communication with the inner bore 42 of the piston 41 by means of a passage 54, the passage being an escape for any pressure fluid which might leak past the sealing assembly 48. A passage 55 having an air filter 56 is vertically disposed in the booster housing 17 in communication with the separation chamber 53 and the left end thereof and provides a drain for any fluids which might collect in said counterbore 53. It is apparent that the rightward portion 39' of the throttling valve 39 is subjected to atmospheric pressure to offset or balance the equal and opposite force on the leftward end of the portion 33' of the piston rod 33. It is also apparent that atmospheric pressure acts on the effective area of the power piston 41 in the bore 42 and this area is balanced by an equal effective area of the piston 41 in the separation chamber 53 outwardly of the seal 52.

The brake housing 18 partially extends into the counterbore 53 having a bore 57 which defines the outlet chamber C at the right end thereof, and which slidably receives a master cylinder portion 58 which is retained therein by suitable means. The piston 58 has a leftward sleeve or annular projection 59 with a long recess or bore 60 to receive an extension 61 of the power piston 41. The extension 61 and sleeve 60 have an axial extent of sufficient length to assure rectilinear actuation of the piston 58 in the chamber C. It is apparent that the pistons 41 and 58 may be integral so that the power piston has an extension with a piston working end in the outlet chamber C. A resilient boot 62 is interposed between the sleeve 59 and the brake housing 18 in circumscribing relation therewith and prevents the entry of foreign matter. An annular spacer 63 is positioned against the right end wall 80 of the counterbore 53, and a spring 64 extends from the spacer against a retainer 65 carried by the extension 61 and interposed in a step 79 formed between adjacent vertical walls of the pistons 41 and 58. The spring 64 is of negligible force only great enough to bias the retainer 65 against the left end wall 81 of the separation chamber 53 adjacent to the power portion of the servo motor 4 for returning the power piston 41 to inoperative or retracted position. The retainer 65 may function as a deflector or drip guard to prevent flow of any power hydraulic fluid seeping past seal 52 from migrating along the piston sleeve 59.

A primary seal 66 is provided in chamber C for the working end of the piston 58 and a spring and retainer assembly 67 biases the seal 66 into an abutting relationship with the piston 58. The sleeve 59 also carries a secondary seal 68 in sealing contact with the bore 57, the seal 68 being formed of a material to seal brake fluid. It is apparent from FIG. 1 that the separation chamber 53 has an axial extent greater than the maximum stroke of the pistons 41 and 58, and that the piston surfaces sealed by sealing assemblies 52 and 68 are never in contact with other surfaces whereby transfer of power and brake fluids is prevented.

A reservoir port 69 is vertically disposed in the brake housing 18 for compensation purposes. One end of the port 69 receives the conduit 15 and the other end 69' intersects the bore 57 adjacent to the lip of the seal 66 in its normal inoperative position. In FIG. 2, a compensation valve 70 is biased by a spring 71 into a seat 72 formed by the juncture of a bore 73 and an axially aligned counterbore 74 horizontally disposed in the brake housing 18, the right end of said spring 71 abutting against an end plug 75 fixedly received in the counterbore 74. The left end of the bore 73 is connected to the reservoir port 69 by a cross-drilled passageway 76. Another cross-drilled passage 77 is provided in the brake housing 18, one end thereof intersecting the counterbore 74, the mid-portion thereof being in communication with the bore 57, and the other end forming a brake port 78. The brake port 78 receives the conduit 14, FIG 1, connecting the bore 57 with the brake assemblies.

In this series system, the pressure relief valve 10 actuates at a pressure equal to the sum of the maximum pressure differentials allowed across the individual servo motors thereby protecting the pumping means 1 from pressure overloads. Pressure overloading of the pumping means 1 develops when the servo motor 4, or other servo motors of other devices such as steering valve 7, exceeds the predetermined maximum pressure differential assigned thereto. The servo motor 4 is provided with a pressure relief valve 26 which limits the magnitude of the maximum pressure differential allowed thereacross. However, the fluid pressure existing in a servo motor at any time is effective upon every servo motor of prior position in the system. For instance, if the steering valve 7 is actuated, the pressure differential created thereacross causes a back pressure which is effective throughout the servo motor 4 and against which the pumping means 1 must work. Ordinarily, a servo motor of prior position would be actuated by this back pressure. However, the servo motor 4 is balanced to prevent such an occurrence, this balancing being achieved by a symmetry of cross-sectional areas which are affected by the aforesaid back pressure. The opposing effective cross-sectional areas of the piston 41, the valve 39, and the valve rod 33, respectively, are constructed to be equal and self-cancelling when acted upon by the ambient fluid pressure existing in that particular section of the hydraulic system. Atmospheric pressure is also prevalent acting upon opposing effective cross-sectional areas of the piston 41, and the valve 39 and the valve rod 33. However, the forces thus created are also equal and self-cancelling. Consequently, regardless of the ambient pressure the servo motor 4 is balanced to function independently in the series system.

Assuming the steering valve to be unrestricted, pressure fluid is normally discharged from the pumping means 1 through the conduit 5 and the inlet 24 into the inlet chamber A of the servo motor 4. As shown by the flow directional arrows in FIG. 3, the pressure fluid then flows between the valve rod 33 and the valve 39 through passage 40' and through the passages 46, the outer bore 44, and the normally unrestricted throttling passages 47 into the outlet chamber B. From the outlet chamber B the fluid flows by means of the outlet 25 and the conduit 6 into the power steering valve 7 and is returned to the reservoir 2 through the conduit 8.

When the vehicle operator applies a force to the actuating pedal 36, a throttling force is transmitted to the push rod 35, the linkage 34, the valve rod 33 and the throttling valve 39 which is moved rightwardly restricting pressure fluid flow through the throttling channel D between the flange 45 and the right end of the throttling passages 47. Consequently, a pressure differential is created across the power piston 41 between the chamber B and the portion of the outer bore 44 of the piston 41 between the piston and the throttling valve flange 45 to develop a back pressure against which the pumping means 1 must work. The pressure differential also exists across the sealing cup 51 between the chamber A and the portion of the bore 44 between the seal 51 and the left side of the throttling valve flange 45. In effect, the pressure differential across the piston 41 exists in the chambers A and B, and this pressure differential is also exerted as a reactionary force on the throttling valve flange 45 in opposition to the actuating force thereby providing "feel." Because of the existing pressure differential between chambers A and B, the piston 41 moves rightwardly compressing the spring 64 in the separating counterbore 53 and actuating the piston 58 and the seal 66 further into the outlet chamber C to develop brake pressures in the wheel cylinders 13. The valve 39 and valve rod 33 are maintained in a restricted, but not closed, position relative to the piston 41 by the manually applied force in opposition to the pressure of the power fluid acting on the rightward side of the radial flange 45 of the throttling valve 39 in order to continue the braking application. This movement displaces brake fluid from the pressure producing chamber C through the brake port 78 and the conduit 14 into the wheel cylinders 13 thereby actuating the brake assemblies. The brake fluid pressure developed in the chamber C acts on the effective area of the seal 66 creating a reactionary force in opposition to the motivating force of the piston 41. When the reactionary force equals the motivating force, the rightward movement of said piston 41 ceases. In the above described case, the operator is afforded a "feel" as to the extent of the braking application in that he "feels" the created pressure differential on the effective areas of the valve rod 33 and the valve 39 which is directly proportional to the hydraulic output to the wheel cylinders 13.

When the operator releases the applied force, the established fluid pressure in the bore 57, the spring 64, and the spring 67 returns the piston 41, the piston 58, and parts associated therewith to their normal positions. When this occurs, a partial vacuum is developed in the bore 57, and the pressure differential across the valve 70 opens the valve allowing brake fluid to compensate into the bore 57. Therefore, the vacuum created in the bore 57 is overcome and any excess fluid present when the wheel cylinders are in inoperative position is returned to the reservoir line 15 through port 69'.

In the event of power failure, the operator is required to supply all the actuating force in operating the servo motor 4. As previously described, the force applied by the operator motivates the valve 37 rightwardly. Due to the absence of pressure fluid circulation through the throttling passages 47, restriction of the passage D does not develop a pressure differential to motivate the power piston 41. Consequently, the right end of the valve 39 abuts against the power piston 41 and carries the piston 41 and the piston 58 rightwardly. Upon this rightward movement, the lip of the sealing cup in the sealing assembly 51 will collapse allowing the pressure fluid to flow thereby. Therefore, the use of a reverse flow valve allowing pressure fluid recirculation is obviated. This rightward movement also displaces brake fluid from the outlet chamber C through the brake port 78 and the conduit 14 into the wheel cylinder assemblies 13 to actuate the brake assemblies. Upon release of the applied force, the brake fluid pressure in the bore 57 and the compressive force of the springs 64, 67 and 49 return the power piston 41, the piston 58, the valve rod 33 and parts associated therewith to their normal position.

The construction of the servo motor 4 completely isolates the oil based pressure fluid used in the power hydraulic system from the brake fluid employed in the braking system. Any oil based pressure fluid leaking past the sealing assembly 48 in the power piston 41 will flow through the passage 54 into the separation chamber 53, and any pressure fluid leaking past the sealing assembly 52 flows directly into the chamber 53. Therefore, any pressure fluid collecting in the separating counterbore 53 will drain therefrom through the passage 55. The braking system is protected from the entry of pressure fluid thereinto by the boot 62 in the counterbore 53. If any brake fluid escapes past the secondary seal 68, it will collect in the boot 62. However, if said boot 62 should rupture, the brake fluid will drain from the counterbore 53 through the passage 55 and in any event no transfer of fluids will be effected in continuous operation of the servo motor without a boot 62 since no seal for one fluid wipes a surface exposed to the other fluid. Therefore, the servo motor 4 completely separates the pressure fluid in the power hydraulic system from the brake fluid of the braking system.

This invention is intended to cover all changes and modifications of the example of the invention herein chosen for purposes of the disclosure, which do not constitute departures from the spirit and scope of the invention.

What we claim is:

1. In a power hydraulic servo motor comprising a housing having a bore with a piston assembly therein movable in a work producing direction, a variable orifice in said piston assembly through which pressure fluid is continuously circulated, throttling means movable relative to said piston assembly to reduce the size of said variable orifice and establish a pressure differential to effect movement of said piston assembly in the work producing direction, and flange means on said throttling means responsive to the established pressure differential to oppose subsequent movement of said throttling means to reduce the size of said variable orifice.

2. In a power hydraulic servo motor comprising a housing having a bore with a piston assembly therein movable in a work producing direction, a variable orifice in said piston assembly through which pressure fluid is continuously circulated, and means including flange means movable relative to said piston assembly in response to an applied force to reduce the size of said variable orifice and establish a pressure differential to effect movement of said piston assembly in the work producing direction, said flange means being responsive to the established pressure differential to create a proportional reactive force in opposition to said applied force.

3. A hydraulic cylinder comprising a housing having a bore therein, piston means slidable in said bore, expansible chambers in said bore on opposite sides of said piston means, throttling valve means normally juxtaposed with said piston means, flange means on said throttling valve means, normally unrestricted, but variable, passage means formed between said throttling valve and piston means and connecting with said chambers, means for continuously circulating pressure fluid through said passage means and chambers, means for moving said throttling valve means relative to said piston means to reduce the size of said passage means and effect a pressure differential across said piston means, the developed pressure differential acting to energize said piston means and acting on said flange means to oppose subsequent movement of said throttling means.

4. A hydraulic servo motor comprising a housing having aligned bores therein, piston means slidable in one of said bores, extension means on said piston means slidable in the other of said bores to generate fluid pressure therein, expansible chambers in said one bore adjacent the opposed faces of said piston means, throttling valve means slidable in said piston means, flange means on said throttling valve means, normally unrestricted, but variable, passage means formed between said throttling valve means and piston means and connecting with said expansible chambers, means connected with said expansible chambers for continuously circulating pressure fluid through said expansible chambers and passage means, and force applying means connected to move said throttling valve means relative to said piston means reducing the size of said passage means and restricting the circulation of pressure fluid therethrough to develop a pressure differential across said piston means wherein the developed pressure differential acts on said piston means to move said piston means and extension means to generate fluid pressure in said other bore and acts on said flange means to create a proportional reactive force in opposition to the force applying means.

5. A hydraulic cylinder comprising a housing having a bore therein, piston means slidable in said bore and having a work producing end extending exteriorly of said bore, expansible chambers in said bore adjacent the opposed faces of said piston means, an atmospheric chamber in said piston, throttling valve means slidable in said piston chamber, flange means on said throttling valve means, a normally unrestricted throttling passage formed between said flange and piston means and connecting with said expansible bore chambers, means for continuously circulating pressure fluid through said expansible bore chambers and throttling passage, and means for applying a force to move said throttling valve means relative said piston means thereby reducing the size of said throttling passage and effecting a pressure differential across said piston means to actuate said piston means and the work producing end thereof, the developed pressure differential acting on said flange means to oppose movement of said last named means.

6. A hydraulic cylinder comprising a housing having a bore therein, a piston slidable in said bore and having a work producing end extending exteriorly of said bore, inlet and outlet chambers in said bore communicating with the opposed faces of said piston, a chamber in said piston vented to atmosphere, a throttling valve slidable in said piston chamber and having an applied force receiving end extending exteriorly of said bore, throttling flange means on said throttling valve, a throttling passage formed between said flange means and piston and connected with said inlet and outlet chambers, means for continuously circulating pressure fluid through said inlet and outlet chambers and throttling passage, said throttling valve being responsive to an applied force to move said flange means relative to said piston for reducing the size of said throttling passage and effecting a pressure differential across said piston to actuate said piston and work producing end thereof, the developed pressure differential acting on said flange means in opposition to movement of said throttling valve in response to the applied force thereon.

7. A hydraulic servo motor comprising a housing having a bore therein, a piston slidable in said bore and having an extension with a work producing end extending exteriorly of said bore, said piston having a central chamber vented to atmosphere, a throttling valve having one end slidable in said chamber and the other end extending exteriorly of said bore, said throttling valve including an annular throttling flange movable axially relative to said piston and defining a throttling passage therebetween, means biasing said throttling valve away from said piston to normally maintain said throttling passage in unrestricted condition, inlet and outlet chambers in said bore between said housing and said throttling valve and piston, respectively, said inlet and outlet chambers being connected to said throttling passage, and means for continuously circulating pressure fluid through said inlet and outlet chambers and throttling passage, said throttling valve being movable relative to said piston by an applied force to reduce the size of said throttling passage for creating a pressure differential across said piston to actuate the extension exteriorly of the bore, said developed pressure differential also acting on said annular flange of said throttling valve in opposition to the applied force thereon.

8. A hydraulic servo motor comprising a housing having aligned bores therein, a piston slidable in one of said bores dividing it into expansible first and second chambers, an extension on said piston extending into the other of said bores and adapted for movement therein to generate fluid pressure, a central chamber in said piston vented to atmosphere, a throttling passage formed in said piston in communication with said second chamber, a throttling valve in said first chamber having one end slidable in said central chamber of said piston and the other end thereof positioned exteriorly of said one bore for receiving an applied force thereon, flange means on said throttling valve movable relative to said piston and including a portion cooperable with said piston to control the size of said throttling passage, resilient means normally biasing said throttling valve to an inoperative position and maintaining the flange means portion in an unrestricting, inoperative position relative to said piston, passage means extending from said first chamber between said throttling valve and piston in communication with said throttling passage, inlet and outlet means connected with said first and second chambers, respectively, for continuously flowing pressure fluid through said first chamber, passage means, throttling passage and second chamber, operator controlled means for applying a force to said other end of said throttling valve to move said throttling valve to an operative position relative to said piston with said flange means portion restricting the size of said throttling passage to develop a pressure differential across said piston to move said piston and extension and generate fluid pressure in said other bore, the developed pressure differential also acting across said flange means to establish a proportional reactive force in opposition to the force applied by said operator controlled means.

9. In a hydraulic cylinder including piston means slidable therein and having opposed faces, throttling means movable relative to said piston means in response to an applied force, normally unrestricted, but variable, passage means formed between said throttling means and piston means interconnecting said opposed piston faces and through which pressure fluid is continuously flowed, the combination therewith comprising flange means on said throttling means and movable therewith relative to said piston means in response to the applied force into flow restricting relation with said passage means reducing the size of said passage means and establishing a pressure differential between said opposed piston faces to effect movement of said piston means, said flange means being responsive to the established pressure differential to create a reactionary force in opposition to the applied force to oppose subsequent movement of said throttling means to further reduce the size of said passage means.

10. A hydraulic cylinder comprising a piston slidable therein and having a work producing end extending exteriorly of said cylinder, a pair of stepped bores in said piston, expansible inlet and outlet chambers in said cylinder adjacent the opposed faces of said piston, normally unrestricted, but variable, orifice means in said piston between said outlet chamber and one of said stepped bores, throttling means slidable in the other of said stepped bores and having flange means thereon slidable in said one stepped bore, said flange means being normally positioned in non-restricting relation with said orifice means, passage means in said valve means between said inlet chamber and said one stepped bore, means for continuously flowing pressure fluid from said inlet chamber to said outlet chamber through said passage means, said one stepped bore and said orifice means, said throttling means being movable relative to said piston means to position said flange means in flow restricting relation with said orifice means to establish a pressure differential between said inlet and outlet chambers and energize said piston and the work producing end thereof, the established pressure differential also acting on said flange means to oppose subsequent movement of said throttling means.

References Cited in the file of this patent
UNITED STATES PATENTS

| | | |
|---|---|---|
| 2,059,082 | Brady et al. | Oct. 27, 1936 |
| 2,464,367 | Balogh et al. | Mar. 15, 1949 |
| 2,544,042 | Pontius | Mar. 6, 1951 |
| 2,844,941 | Ayers | July 29, 1958 |